(12) United States Patent
Sugiyama et al.

(10) Patent No.: US 7,918,641 B2
(45) Date of Patent: Apr. 5, 2011

(54) HANDLING MECHANISM OF TRAYS WITH WHICH ELECTRONIC PARTS ARE FED AND INSPECTION DEVICE OF THE ELECTRONIC PARTS USING THE MECHANISM

(75) Inventors: Toshinori Sugiyama, Ashigarakami-gun (JP); Yoshinori Tokumura, Ashigarakami-gun (JP); Syoji Tsuyuki, Ashigarakami-gun (JP); Toshiaki Suzuki, Ashigarakami-gun (JP); Shinji Kawamoto, Ashigarakami-gun (JP)

(73) Assignee: Hitachi High-Technologies Corporation, Toky (JP)

( * ) Notice: Subject to any disclaimer, the term of this patent is extended or adjusted under 35 U.S.C. 154(b) by 328 days.

(21) Appl. No.: 12/181,735

(22) Filed: Jul. 29, 2008

(65) Prior Publication Data
US 2009/0035119 A1 Feb. 5, 2009

(30) Foreign Application Priority Data

Jul. 31, 2007 (JP) ................................. 2007-198793

(51) Int. Cl.
*B65G 59/06* (2006.01)
*B65G 57/30* (2006.01)
(52) U.S. Cl. ............ 414/798.1; 414/798.4; 414/331.16; 414/788.7; 414/416.01; 414/795.3
(58) Field of Classification Search .... 198/347.1–347.4, 198/460.1, 465.3, 817; 414/280–281, 287, 414/331.01, 331.04, 331.13–331.14, 331.16, 414/331.18, 403–404, 411, 416.01, 416.03, 414/416.05, 416.11, 788.2, 793.4, 793.5, 794.2, 794.9, 795.2, 795.3, 924, 928–929
See application file for complete search history.

(56) References Cited

U.S. PATENT DOCUMENTS

| | | | | | |
|---|---|---|---|---|---|
| 4,687,403 | A | * | 8/1987 | Motoda | 414/788.4 |
| 5,024,593 | A | * | 6/1991 | Hehl | 425/556 |
| 5,203,661 | A | * | 4/1993 | Tanita et al. | 414/331.16 |
| 5,743,695 | A | * | 4/1998 | Ryu | 414/331.01 |
| 6,135,705 | A | * | 10/2000 | Katoch | 414/795 |
| 6,248,967 | B1 | * | 6/2001 | Nakamura | 209/573 |
| 6,283,703 | B1 | * | 9/2001 | Dowling et al. | 414/788.7 |
| 6,524,052 | B1 | * | 2/2003 | Yamauchi et al. | 414/331.1 |
| 2003/0002964 | A1 | * | 1/2003 | Hee et al. | 414/331.18 |
| 2004/0086364 | A1 | * | 5/2004 | Watanabe et al. | 414/416.01 |
| 2005/0129301 | A1 | * | 6/2005 | Kanno et al. | 382/145 |

FOREIGN PATENT DOCUMENTS
JP 2001-052319 2/2001
JP 2006-179107 7/2006

* cited by examiner

*Primary Examiner* — Gregory W Adams
(74) *Attorney, Agent, or Firm* — Mattingly & Malur, P.C.

(57) ABSTRACT

In the present invention, through the provision of a tray placing rack for storing trays in multi steps, the trays accommodating electronic parts after inspection are received in the racks and through the provision of a tray stacking rack above the tray placing rack, an empty tray emptied by having been inspected of the electronic parts before inspection at an inspection stage is stacked on the tray stacking rack. When a certain tray is filled with electronic parts after inspection and is discharged, an empty ray is taken out from the tray stacking rack and the empty tray is fed to the rack position of the discharged tray to permit re-use of empty trays.

20 Claims, 6 Drawing Sheets

HANDLING MECHANISM OF TRAYS WITH WHICH ELECTRONIC PARTS ARE FED AND INSPECTION DEVICE OF THE ELECTRONIC PARTS USING THE MECHANISM

FIELD OF THE INVENTION

The present invention relates to a handling mechanism of trays with which electronic parts are fed and an inspection device of the electronic parts using the mechanism, and more specifically relates, when many magnetic head assemblies (a magnetic head+a suspension spring) arranged and accommodated in a tray are fed to an inspection stage via the tray to continuously inspect the magnetic head assemblies, to a handling mechanism of trays for the magnetic head assemblies fed by the trays, in which an exchange frequency of the trays is decreased as well as a size for the device can be reduced.

BACKGROUND ART

Recently, an increase in the recording density of magnetic discs has accelerated and presently, hard disc drive devices (HDD) which have a capacity on an order of several hundreds gigabytes have become mainstream. Due to the increases in the recording density in magnetic discs, a floating amount of each magnetic disc lowers.

In a recent magnetic head assembly, at the top of a suspension spring of about 15 mm~20 mm, a slider having a size of about 0.3 mm~1 mm square is attached and a gap between a thin film magnetic head and a disc becomes a distance of a few nm to 10 nm.

A magnetic disc as an information recording medium and a magnetic head (magnetic head assembly) performing data reading and writing in the magnetic disc for an HDD in such relationship are subjected to a precise performance inspection with respective inspection devices at the production stages thereof.

Further, present uses of HDDs are spreading in the fields such as automotive products, home appliances and audio products, and hard disc drive devices of from 3.5 inches to 1.8 inches and even less than 1.0 inch are built into a variety of products and used therein. Therefore, price reduction and mass production of the HDDs are demanded. For this reason, a magnetic head inspection device having a reduced size, which can inspect many magnetic heads efficiently is needed.

In order to enhance an inspection efficiency of magnetic discs or magnetic heads, an inspection device in which a plurality of inspection decks are provided and signals from magnetic heads are distributed or selectively changed over between the inspection decks and processed therein respectively is disclosed and already known from JP-A-2001-52319 and JP-A-2006-179107.

An inspection deck in a conventional magnetic head inspection device is constituted in such a manner that one or two carriages are provided for one spindle and normally one corresponding measurement unit is provided for the respective carriages. After completing inspection of a magnetic head in a unit of magnetic head assembly, the post-inspection magnetic head assembly is exchanged with a new pre-inspection magnetic head assembly serving as an inspection object. The exchange in this instance is presently performed manually. The same is true with respect to an inspection device of magnetic discs.

Therefore, in order to enhance a throughput of the magnetic head inspection, the present assignee proposed a system of automatically inspecting magnetic head assemblies in which the magnetic head assembly exchange work is automated and many magnetic head assemblies are accommodated in a tray and are fed therefrom, and filed as Japanese Patent Application No. 2007-172300. This system is for automating the inspection system from the tray to magnetic head assemblies. However, in this instance, when feeding and discharging of trays are delayed in time, of the throughput of magnetic head inspection is unable to be enhanced.

One of ideas of continuous feeding and discharging system of trays themselves is to dispose the trays themselves in double and to use one of the trays for inspection and during the use thereof to exchange another tray emptied after completing the parts inspection with a feed tray and to discharge the same. Further, a tray for accommodating post-inspection parts is also necessary. When the tray is filled with post-inspection parts, the tray has to be discharged and an empty tray has to be fed.

When such a tray feeding and discharging system is employed, respective two systems are necessitated for feed trays of pre-inspection electronic parts (for example, the above magnetic head assemblies) and for discharge trays of post-inspection electronic parts. Moreover, empty trays are respectively generated in different timings and are necessitated for respective systems.

Moreover, good (GD) trays in which electronic parts passed the inspection are accommodated are frequently provided for respective ranks classified according to the inspection result. In such instance, a frequency of timing control for tray feeding and discharging and a frequency of tray exchanging extremely increase. Thereby, the work efficiency for the tray feeding and tray discharging is degraded. Further, since a system for feeding and discharging of many trays is needed, a problem arises of increasing the size of the device.

SUMMARY OF THE INVENTION

An object of the present invention is to resolve such problems in the conventional art and to provide, when continuously inspecting electronic parts, for example, magnetic head assemblies (magnetic heads), a handling mechanism of trays for the electronic parts fed by the trays, in which an exchange frequency of the trays and a size for the device can be decreased, or an inspection device for the electronic parts using the mechanism.

A construction of a handling mechanism of trays for the electronic parts fed by a tray or an inspection device for the electronic parts using the mechanism, which achieves such object, is provided with:

a tray placing rack for storing trays in multi steps provided in a standing up state which stores a tray accommodating electronic parts before inspection and a tray accommodating electronic parts after inspection in respective racks, an empty tray rack which is located above the tray placing rack and has a first opening permitting the tray to pass therethrough in up and down direction and on which an empty tray emptied by taking out electronic parts from trays accommodating the electronic parts before inspection is held at or above the position of the first opening, a first handling robot which is disposed so as to correspond to the front face of the tray placing rack for putting in and out one of the trays and move one of the trays in up and down direction along the front face so as to put one of the trays in and out the tray placing rack, and a control unit which performs processes of feeding the empty tray on the empty tray rack from the lower side of the first opening via the first opening by controlling the first tray handling robot or a second tray handling robot, taking out the empty tray placed on the empty tray rack from the bottom of the first opening as a tray for accommodating electronic parts after inspection by controlling the first tray handling robot or the second tray handling robot, and feeding the same on the tray placing rack by the first tray handling robot.

As has been explained above, in the present invention, through the provision of the tray placing rack for storing trays in multi steps, the tray accommodating electronic parts before inspection and the trays accommodating electronic parts after inspection are stored in the racks and through the provision of the empty tray rack above the tray placing rack, the empty trays emptied by having been inspected of the electronic parts before inspection at an inspection stage are stacked on the empty tray rack. When a certain tray is filled with electronic parts after inspection and is discharged, an empty ray is taken out from the empty tray rack and the empty tray is fed to the rack position of the discharged tray to permit re-use of empty trays.

As a result, through the re-use of the empty trays within the inspection device, a discharge process of the empty trays from the inspection device is unnecessitated. Moreover, the empty tray rack serving as an empty tray stocker is provided above the tray placing rack. Since an empty tray is fed to the empty tray rack via the first opening from the bottom thereof, the operation of a handling robot for placing the empty tray or stacking empty trays on the empty tray rack can be performed in a like operation when putting in and out of trays with respect to the tray placing rack. Thereby, a feeding and discharging of empty trays with respect to the empty tray rack can be performed with a simple control. Moreover, since the empty trays may be stored on the empty tray rack in a stacked manner as a tray stacking rack, an area required for storing the empty trays is reduced.

Even if the number of trays to be stacked on the tray stacking rack is large, since the height of the tray stacking rack is suppressed, the size of the inspection device as a whole can be reduced. Moreover, when the number of steps for the tray placing rack is increased, the tray placing rack can receive the trays classified according to ranks. Further, when a tray stacking rack is added in parallel, feed trays of electronic parts before inspection or discharge trays of electronic parts after inspection can be placed on the added tray stacking rack in a stacked manner in parallel with the empty trays.

Further, when an arm for placing a tray is provided for the first tray handling robot, the arm can be used as an area for providing a feed tray of electronic parts. Namely, electronic parts before inspection can be directly fed to an inspection stage from the tray placed on the arm. Contrary thereto, electronic parts after inspection inspected at the inspection stage can be accommodated in a tray placed on the arm. In designing as in the above manner, no area for providing the feed tray of electronic parts with respect to the inspection stage is required specifically in the inspection device. Thereby, the size reduction of the inspection device can be also realized.

As a result, when continuously inspecting electronics parts, for example, magnetic head assemblies (magnetic heads), an exchange frequency of the trays is decreased while a size for the inspection device of electronic parts is also reduced.

DESCRIPTION OF THE PREFERRED EMBODIMENTS

Figure 1:
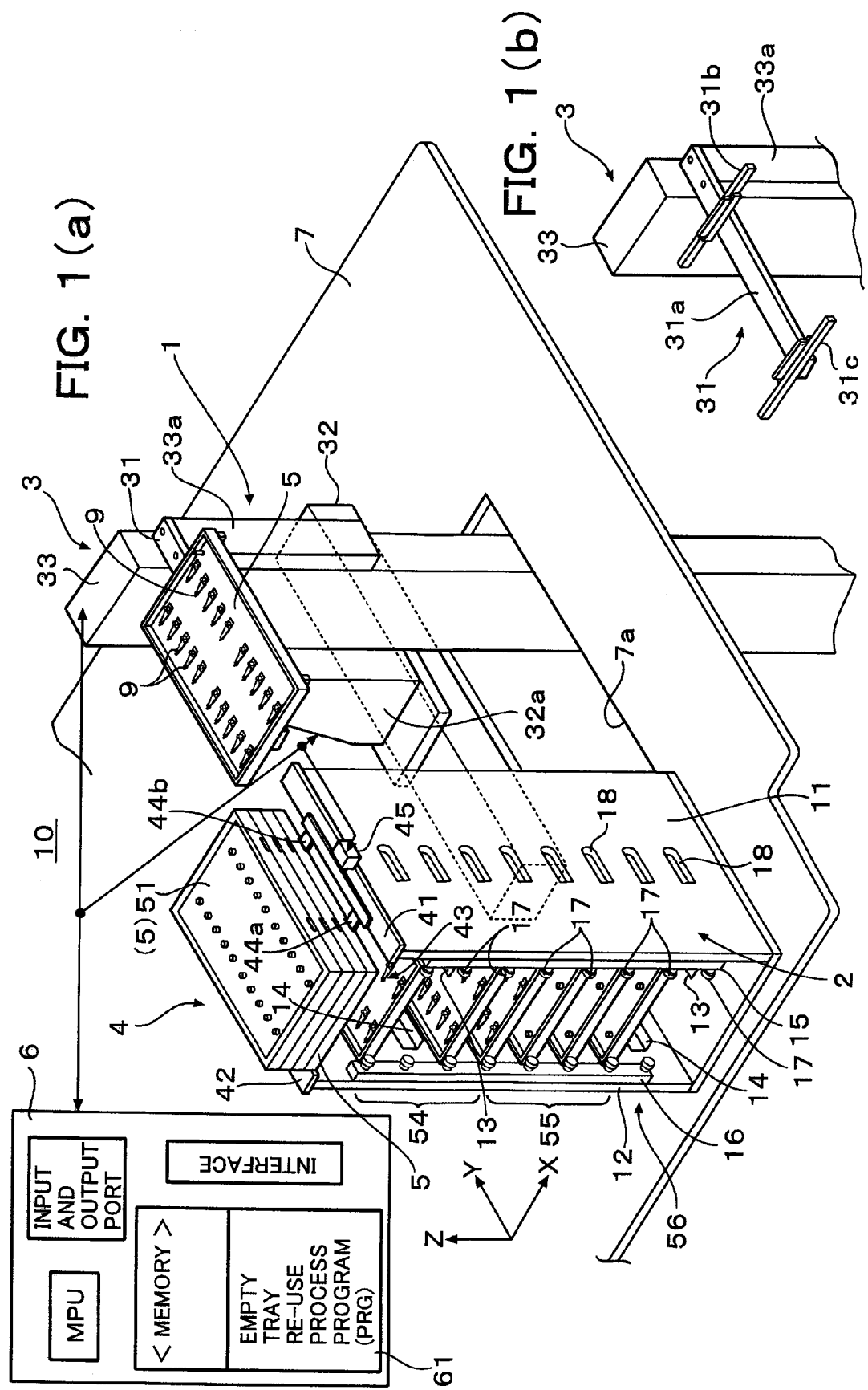
FIG. 1(a) is a perspective view of a tray handling mechanism of magnetic head assemblies representing an embodiment in which a tray handling mechanism of electronic parts fed through a tray according to the present invention is applied and FIG. 1(b) is a view for explaining a H shaped arm of a tray handling robot in the tray handling mechanism.

In FIG. 1 (a), numeral 10 is a magnetic head inspection device, 1 is a tray handling mechanism, 2 is a tray placing rack for storing trays in multi steps, 3 is a tray handling robot, 4 is a tray stacking rack, 5 is a box type rectangular tray for accommodating many magnetic head assemblies in array, 6 is a control unit, 7 is a mounting base for securing the tray placing rack 2, 8 is a magnetic head assembly handling robot (not shown in FIG. 1, see FIG. 5 and herein after will be called as a head handling robot) and 9 is magnetic head assemblies.

The control unit 6 includes therein such as an MPU, a memory, an input and output port and an interface and performs a variety of controls when the MPU executes programs stored in the memory. In the memory a PRG (program) 61 for an empty tray re-use process is stored which will be explained later.

The tray placing rack 2 is provided with racks of 8 steps of which front face is arranged so as to run along X axis under a condition of standing up on the mounting base 7. 8 pieces of trays 5 can be stored individually in vertical direction (Z axis direction) in respective racks. The upper racks of 3 steps are for feed tray placing rack 54 for accommodating magnetic head assemblies before inspection. The lower racks of 4 steps are for ranked tray placing rack 55 for accommodating respective magnetic head assemblies ranked according to the inspection result. The lower racks of 4 steps are respectively rack for rank A, rank B, rank C and rank D corresponding to the inspection result in the order from the upward. The rack of the lower most step is for a discharge tray rack 56 where a tray for discharge is placed.

The tray handling robot 3 includes an H shaped arm 31 (see FIG. 1 (b)) for placing a tray 5, advances or retreats with respect to the front face of the tray placing rack 2 through control of the control unit 6 and moves the H shaped arm 31 in up and down direction (Z axis direction).

Numeral 32 is an in Y axis moving mechanism that is a beam shaped bock in which a moving base 32a therefor advances or retreats along Y axis toward the front face of the tray placing rack 2. An in Z axis moving mechanism 33 is attached to the moving base 32a so as to move the in Z axis direction moving mechanism 33 in Y axis direction. The H shaped arm 31 is provided on an up and down moving base 33a of the in Z axis moving mechanism 33.

As shown in FIG. 1 (b), the H shaped arm 31 is constituted by a guide bar 31a projecting horizontally toward the front side of the tray placing rack 2 and support bars 31b and 31c extending horizontally in perpendicular direction with respect to the guide bar 31a and attached thereto at the front and back sides thereof. The back end of the guide bar 31a extends to the up and down moving base 33a and the top end thereof is secured to the up and down moving base 33a. The outline shape of the H shaped arm 31 is slightly smaller than the bottom shape of the tray 5. The tray 5 is placed on the H shaped arm 31 and the bottom of the tray 5 is held by the H shaped member.

The in Z axis moving mechanism 33 is a pillar shaped block for moving the H shaped arm 31 in up and down direction. The up and down moving base (herein after will be called as Z moving base) 33a movable in Z direction is provided at a side face of the block. The end portion of the H shaped arm 31 is secured on the upper face of the Z moving base 33a so as to support the H shaped arm 31 while projecting the same horizontally toward the front face of the tray placing rack 2.

The in Z axis moving mechanism 33 passes through a rectangular opening 7a provided in the mounting base 7 and further extends downward therefrom. The reason for this is that in order to permit positioning the H shaped arm 31 at the position of the lower most step of the tray placing rack 2 the Z moving base 33a has to move down more by an amount corresponding to the attachment height in Z direction of the H shaped arm 31.

Further, the area of the rectangular opening 7a expands toward the front face of the tray placing rack 2 in the mounting face 7 so as to permit advancing and retreating of the in Z axis moving mechanism 33 with respect to the tray placing rack 2.

Side plates 11 and 12 of the tray placing rack 2 extend upward. The tray stacking rack 4 includes bracket plates 41 and 42, and since the bracket plates 41 and 42 are secured on the upwardly extending side plates 11 and 12 while projecting in horizontal direction, the tray stacking rack 4 constitutes a rack provided further on the rack of the higher most step of the tray placing rack 2. On the bracket plates 41 and 42 support pins 44a and 44b are respectively provided as parts of the rack.

Between the top end sides of the bracket plates 41 and 42 an opening 43 that permits passing of the tray in up and down direction is formed. The respective two support pins 44a and 44b ones at the side of bracket plate 41 are seen in the drawing advance and retreat horizontally along the opening 43 and project horizontally from both sides above the opening 43. The projected support pins 44a and 44b engage with engaged and supported grooves 5a provided at both sides on the outside bottom of the tray 5 and support the tray 5. As shown in the drawing, the projected support pins 44a and 44b engage with the engaged and supported grooves 5a (see FIG. 2) of an empty tray 5 (herein below will be called as an empty tray 51) at the lower most step and support the stacked four empty trays 51. The two support pins 44a and 44b are constituted to be advance and retreatable by means of advancing and retreating mechanism constituted by such as an air cylinder. The advancing and retreating operation is controlled by the control unit 6. An advancing and retreating mechanism 46 at the opposite side having the two support pins 44a and 44b also has the same structure as that of the advancing and retreating mechanism 45, which is shown in FIG. 3.

Now, as explained above, racks of four steps are prepared for receiving the respective magnetic head assemblies 9 classified according to the inspection result. Therefore, although four empty trays 51 are shown as the maximum stacking amount in the drawing, actually, about three empty trays 51 will be sufficient, and no more are required. This is because when assuming that after the magnetic head assemblies 9 being fed and inspected three feed trays are emptied and another feed tray is going to be emptied, and when the classification into the four ranks is performed, at least one tray accommodating ranked magnetic head assemblies 9 according to the inspection result will be filled after the inspection and will be discharged with a high possibility as a discharge tray.

Herein, assuming that a tray 5 placed on the tray handling robot 3 is a feed tray accommodating magnetic head assemblies 9 before inspection, when the last magnetic head assemblies 9 before inspection in the tray 5 is picked up by a head handling robot 8 (see FIG. 5), the tray 5 is emptied, which is moved by the tray handling robot 3 to the tray stacking rack 4 and stacked thereon. In this instance, the tray is fed as an empty tray through the opening 43 from the lower side to the upper side and is stacked on the lower most step in the tray stacking rack 4. The stacking sequence will be explained later. Further, the head handling robot 8 transfers magnetic head assemblies between the inspection stage and the tray 5 placed on the tray handling robot 3 through the control by the control unit 6. Although FIG. 1 does not show this head handling robot 8, the details thereof will be explained with reference to FIG. 5.

The tray placing rack 2 are provided with at the insides of the side plates 11 and 12 tray support metal fittings 13 and 14 projecting inward and horizontally for respective 8 steps as shown at the second step from the top and the lower most step in FIG. 1. The tray support metal fittings 13 and 14 project inward and horizontally from both inside faces of the side plates 11 and 12. The respective top ends thereof are positioned in the space between the side plates 11 and 12 so that the respective intervals therebetween are slightly shorter than the lateral width of the tray 5. The tray 5 received by the rack is supported by the top end sides of the tray support metal fittings 13 and 14 at both ends of the bottom. In this sense, these tray support metal fittings 13 and 14 constitute a rack position in the tray placing rack 2.

An interval in up and down direction (Z axis direction) of the tray support metal fittings 13 and 14 constitutes a rack interval. The rack interval ensures a space below the rack that permits the H shaped arm 31 lowers below the tray support metal fittings 13 and 14 and to retreat from the rack. Further, the rack interval ensures a space above the rack to permit the tray to retreat when the H shaped arm 31 lifts up the tray. Namely, the rack interval is determined so that a space of about two times of the thickness of the tray 5 is formed above and below a tray received.

Further, the length in rack depth direction of the tray support metal fittings 13 and 14 is slightly shorter than the front and back interval between the support bars 31b and 31c so as to permit retreating of the H shaped arm 31 without butting the front and back support bars 31b and 31c to the fittings. For this reason, only a part of the ends of the tray support metal fittings 13 and 14 can be seen as shown in the drawing.

A storing operation of a tray 5 on a rack in the tray placing rack 2 is performed by a rectangular motion of the H shaped arm 31 of advancing, lowering by a predetermined amount, retreating and elevating by a predetermined amount.

Namely, the tray handling robot 3 elevates or lowers the H shaped arm 31 in Z direction until the tray 5 placed on the H shaped arm 31 enters in a space of target rack position in the tray placing rack 2. Then, from the state in FIG. 1, the tray handling robot 3 moves and advances in Y axis direction and inserts the H shaped arm 31 above the rack. The tray 5 is inserted up to a tray positioning roller 17 at the back face side and the H shaped arm 31 is lowered to load the tray 5 on the rack position. Thereby, the tray 5 is supported by the tray support metal fittings 13 and 14.

After the tray 5 is stored on the rack in this manner, the tray handling robot 3 further lowers the H shaped arm 31, then the tray handling robot 3 moves and retreats in Y axis direction to withdraw the H shaped arm 31 from the rack and further elevates the H shaped arm 31 to return the same at the original position.

A taking out of a tray 5 is performed oppositely as above, in that the tray handling robot 3 lowers an H shaped arm 31 having no tray placed thereon by a predetermined amount from the rack position storing a tray 5. Then, the tray handling robot 3 moves and advances in Y axis direction and inserts the H shaped arm 31 below the rack. After advancing the H shaped arm 31 near the tray positioning roller 17 at the back face side, the tray handling robot 3 elevates the H shaped arm 31 to lift up the tray 5 with the H shaped arm 31. Thereby, the tray 5 is lifted up above the tray support metal fittings 13 and 14 while being placed on the H shaped arm 31, and the tray handling robot 3 retreats and withdraw the H shaped arm 31 from the rack and further lowers the H shaped arm 31 to return the same to the original position thereof.

The back face of the tray placing rack 2 is opened. Roller support members 15 and 16 are respectively secured vertically along the inner side faces of right and left both sides at the back face sides of the side plates 11 and 12. On the respective roller support members 15 and 16, eight pieces of the tray positioning rollers 17 are provided at the positions corresponding to the respective racks.

Figure 6:
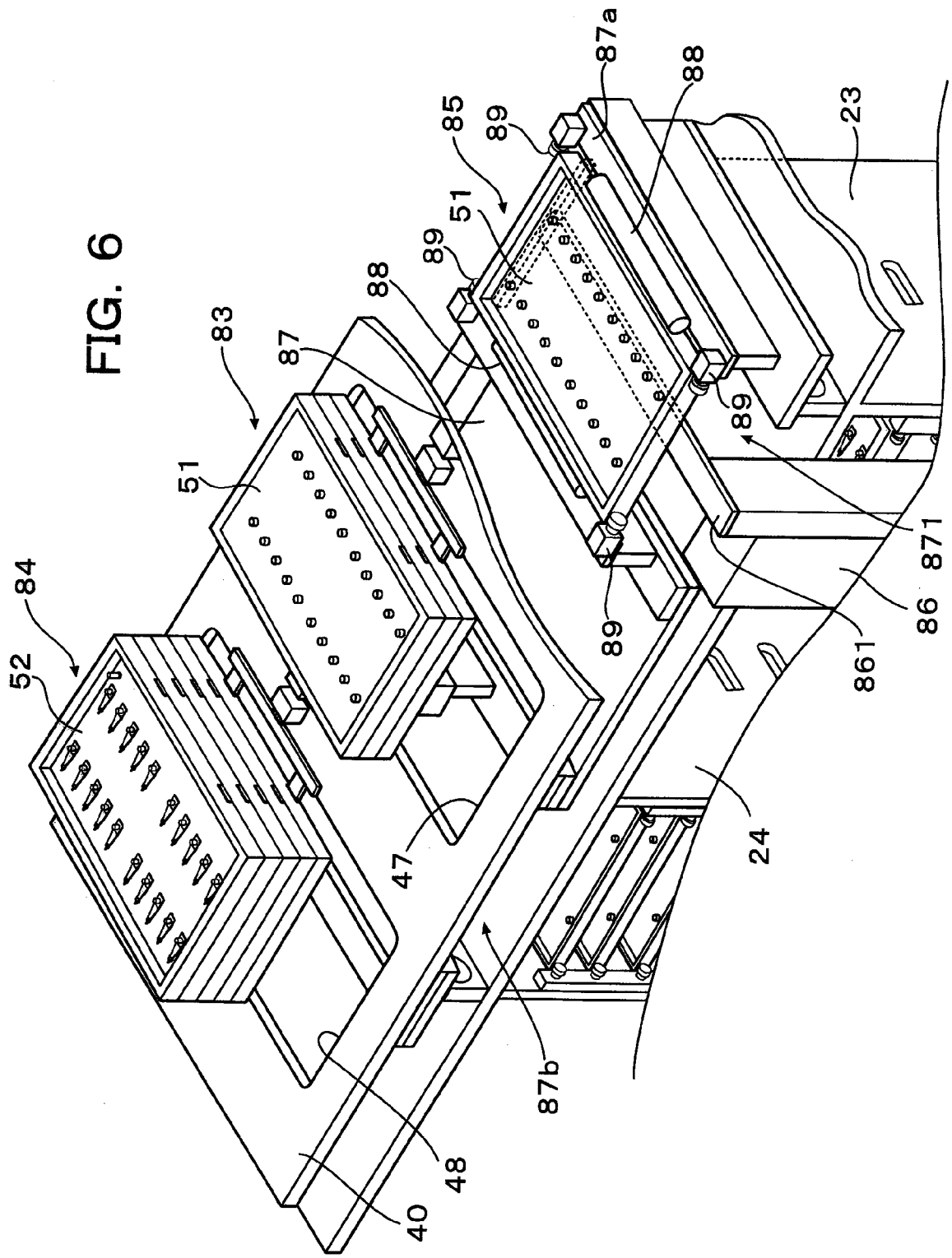
FIG. 6 is a view for explaining the handling process of empty trays, feed trays and discharge trays placed in parallel on the tray stacking racks thereof.

Although not seen from the drawing, on the side walls at the front face side of the tray placing rack 2, eight pieces of the tray positioning rollers 17 are also provided respectively at right and left of the front face in the like positional relationship. Since these tray positioning rollers 17 are in a same relation with the arrangement relationship between positioning rollers 88 as shown in FIG. 6 and the tray 5 and which will be explained later, detailed explanation of their function is omitted. A tray 5 to be stored on a rack butts at front and back to the tray positioning rollers 17 at the corresponding rack position respectively provided vertically along side walls of the front face side and the back face side. Thereby, the front and back of the tray 5 stored is positioned.

Further, the side plates 11 and 12 are provided with elliptical holes 18 at the position corresponding to the respective racks. Although not seen from FIG. 1, at the positions of the respective elliptical holes 18 positioning rollers are mounted. These positioning rollers engage with both side faces of a tray 5 placed on the tray support metal fittings 13 and 14 and position the tray 5 in right and left direction.

These positioning rollers are in a same relation with the arrangement relationship between positioning rollers 88 as shown in FIG. 6 and the tray 5 as referred to above.

Figure 2:
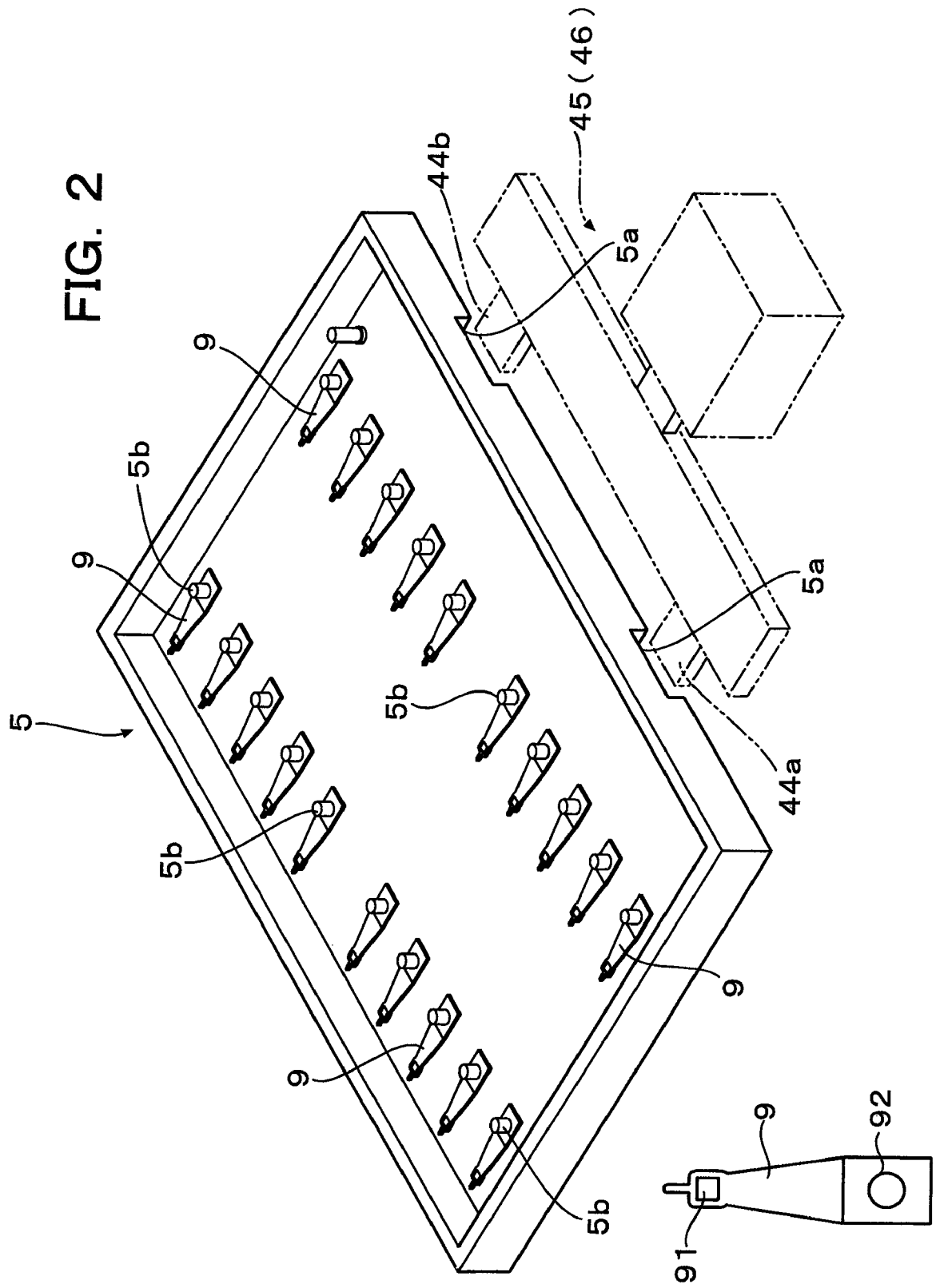
FIG. 2 is a view for explaining the tray therein.
Figure 3A:
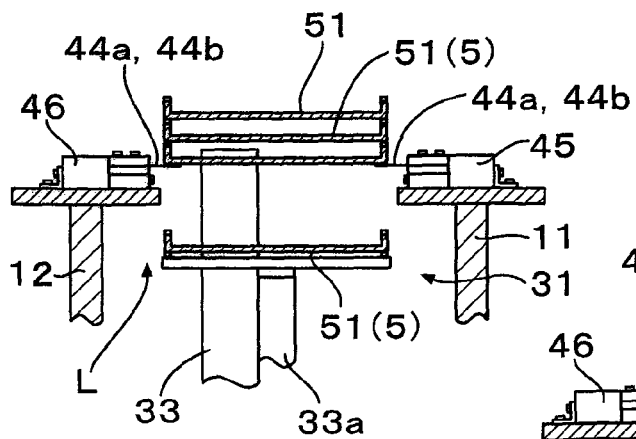
FIG. 3(a)-3(e) are views for explaining a storing and discharging operation of empty trays on the tray stacking rack.
Figure 3D:
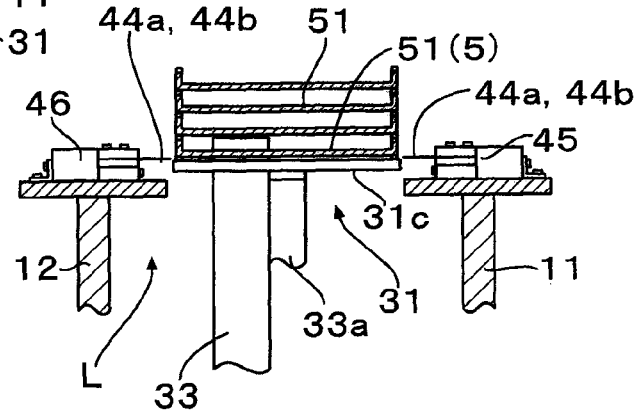
Figure 3B:
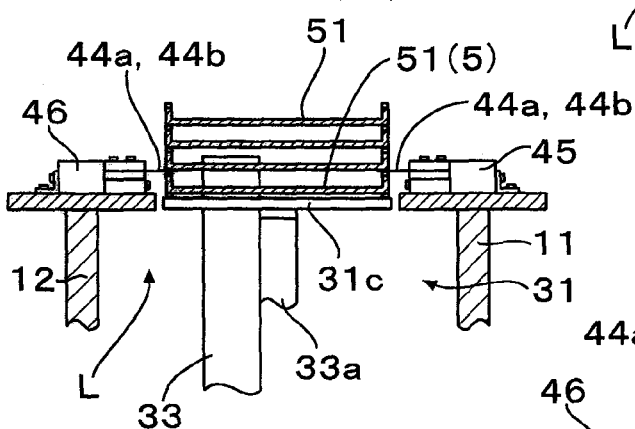
Figure 3E:
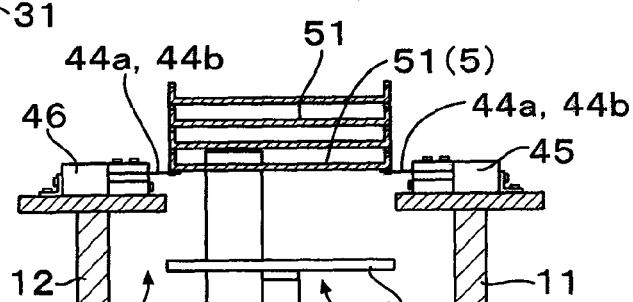
Figure 3C:
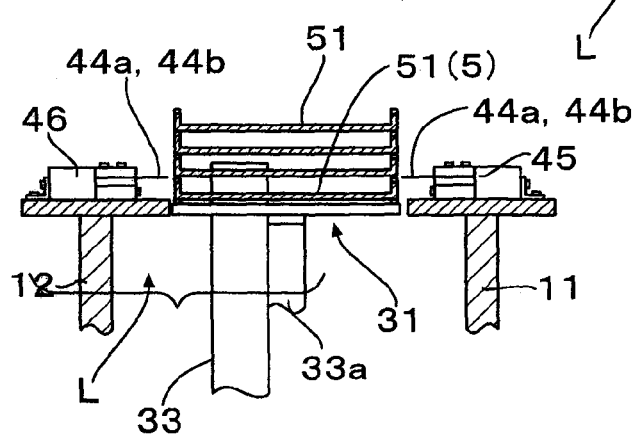

FIG. 2 is a view for explaining such tray 5 and the tray 5 is provided with boss pins 5b arranged in array. As shown at the left side in FIG. 2, the magnetic head assembly 9 is provided with a magnetic head 91 at its top end. A mounting hole 92 is provided at the mounting base of the magnetic head assembly 9 located at the back end of a suspension spring supporting the magnetic head 91. Such magnetic head assemblies 9 before or after inspection are arranged and accommodated in the tray 5 by inserting their mounting holes 92 into the respective boss pins 5b. The engaged and supported grooves 5a are provided at two positions for one side, in total at four positions, on the outside bottom portion at both sides of the box shaped tray 5. Further, in FIG. 2, the engaged and supported grooves 5a at the opposite side are not seen.

Further, a portion shown by dot and chain lines is an advance and retreat mechanism 45 (46) constituted by such as the support pins 44a and 44b and the air cylinder.

FIG. 3 is a view for explaining a storing and discharging operation of empty trays on the tray stacking rack.

As shown in FIG. 3 (a), through control by the control unit 6, the tray handling robot 3 elevates the H shaped arm 31 in Z direction from the state as shown in FIG. 1 so that the tray 5 assumes a height position corresponding to space L between the tray placing rack 2 and the tray stacking rack 4. Subsequently, the tray handling robot 3 moves in Y axis direction toward the front face of the tray placing rack 2, advances the H shaped arm 31 and inserts the tray 5 into the position of the space L. This operation is the same as the inserting operation of the H shaped arm 31 when storing a tray 5 on a rack in the tray placing rack 2, simply the rack position is altered to the position of the space L locating at one step higher position from the rack of the higher most step.

Subsequently, as shown in FIG. 3 (b), the tray handling robot 3 elevates the H shaped arm 31 and contacts the tray 5 to the bottom of an empty tray 51 at the lower most step. At this timing, the control unit 6 controls the advance and retreat mechanisms 45 and 46 and drives the air cylinders to retreat the support pins 44a and 44b as shown in FIG. 3 (c). In this moment, the plurality of the stacked empty trays 51 are supported by the H shaped arm 31. Subsequently, the tray handling robot 3 elevates the H shaped arm 31 by an amount corresponding to the thickness of one tray. As shown in FIG. 3 (d), the tray handling robot 3 elevates the position of the empty tray 51 at the lower most step from the position shown in FIG. 3 (c) by the amount corresponding to the thickness of one tray so as to correspond to the height of the support pins 44a and 44b and then the control unit 6 drives the air cylinders in the advance and retreat mechanisms 45 and 46 to project the support pins 44a and 44b over the opening 43.

As the result, the support pins 44a and 44b engage with the engaged and supported grooves 5a of the empty tray 51 at the lower most step (see FIG. 2), a new empty tray 51 is fed in the lower most step as shown in FIG. 3 (e) and the new empty tray 51 is stacked in the tray stacking rack 4.

Further, when receiving the empty tray at the lower most position, through control by the control unit 6, the tray handling robot 3 elevates the H shaped arm 31 not bearing a tray in Z direction from the state as shown in FIG. 1 so as to assume the state as shown in FIG. 3 (e) as opposite to the above. Then the tray handling robot 3 elevates the H shaped arm 31 up to the bottom portion of the empty tray 51 at the lower most step and contacts the same to the bottom portion of the empty tray 51 at the lower most step. At this timing, the control unit 6 retreats the support pins 44a and 44b to assume the state as shown in FIG. 3 (d).

Further, the tray handling robot 3 is lowered by the amount corresponding to the thickness of one tray to assume the state as shown in FIG. 3 (c). Then, the control unit 6 advances the support pins 44a and 44b to assume the state as shown in FIG. 3 (b). The tray handling robot 3 receives the empty tray 51 at the lower most step by the H shaped arm 31 to assume the state as shown in FIG. 3 (a). Then, the tray handling robot 3 returns from the state as shown in FIG. 3 (a) to the state as shown in FIG. 1 and loads the empty tray 51 on a predetermined empty rack position in the tray placing rack 2.

Now, the re-use process of empty trays 51 by means of the control unit 6 will be explained with reference to FIG. 4.

Further, the re-use process of empty trays 51 explained herein below is performed by executing the empty tray re-use process PRG (program) 61 stored in the memory of the control unit 6 by the MPU in the control unit 6.

At an initial state, feed trays accommodating magnetic head assemblies before inspection are loaded on upper racks of 3 steps in the tray placing rack 2. On the racks of 4 steps below there empty trays 51 are stored at the respective ranked positions as A, B, C and D classified according to inspection result. Further, the rack for the discharge tray at the lower most step is emptied.

Figure 4:
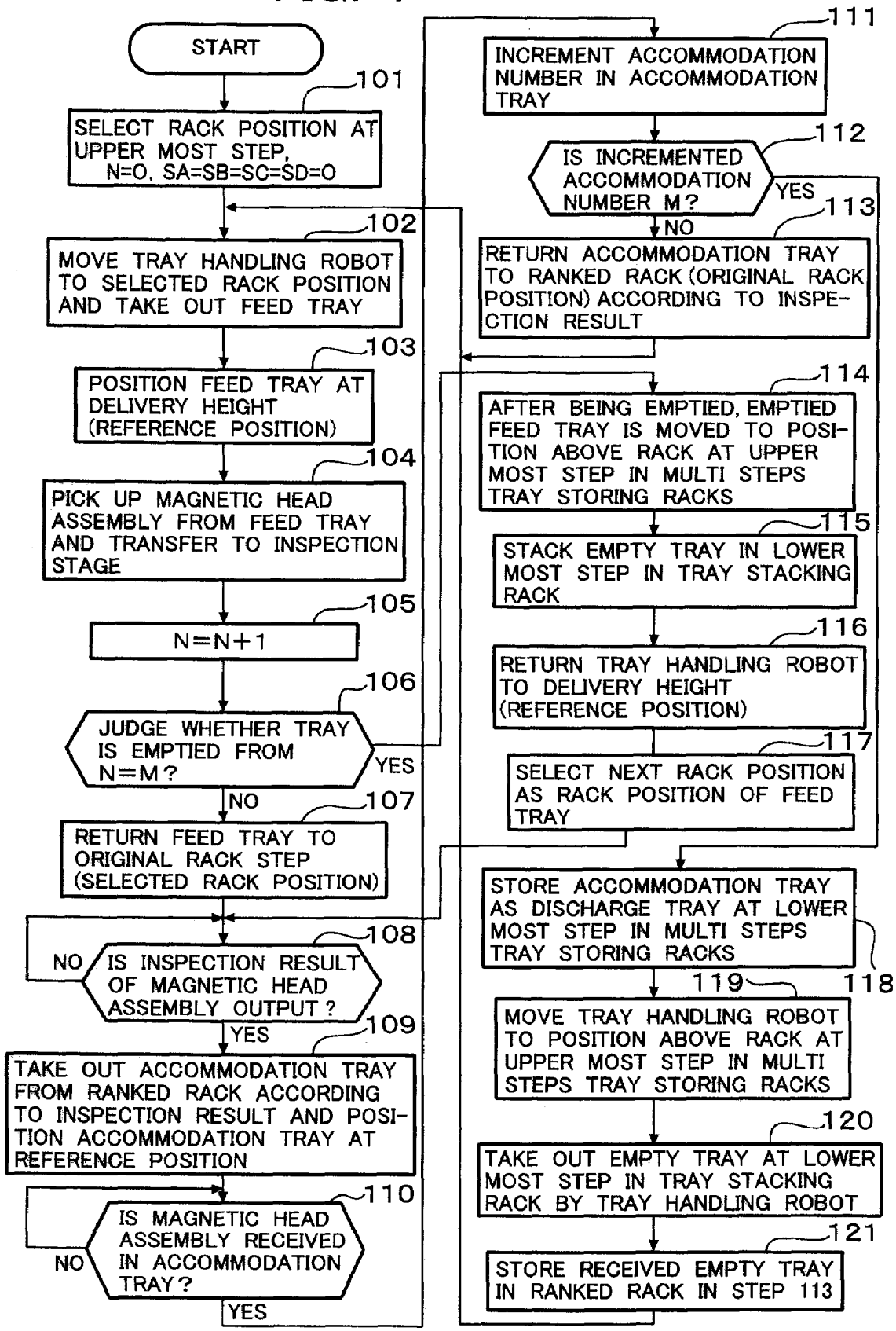
FIG. 4 is a flowchart of a process for empty tray re-use by a control unit.

In FIG. 4, at an interruption start for an inspection start, the MPU in the control unit 6 executes the empty tray re-use process PRG 61, and performs a process of feeding magnetic head assemblies before inspection to the inspection stage. To this end, the MPU selects as the initial setting the rack position at the upper most step as the position of the feed tray, sets parts fed number N as N=0 as well as sets tray accommodation number according to ranks SA, SB, SC and SD as SA=SB=SC=SD=0 (step 101).

Then, through the control by the control unit (MPU) 6, the tray handling robot 3 moves to the designated position among the upper racks of 3 steps in the tray placing rack 2, initially to the position of the feed tray at the upper most step selected in step 101, moves and advances in Y axis direction and then retreats to take out a feed tray therefrom (step 102).

Further, with regard to the position where a feed tray is selected, although the first positioning is at the upper most step, since the feed trays are stored on the upper racks of 3 steps in the tray placing rack 2, when the upper most step is emptied, the tray handling robot 3 is positioned at the next step and when the next step is emptied, the tray handling robot is positioned at the further next step, and thereafter, the robot returns to the rack position at the upper most step to cycle the above operation.

The tray handling robot 3 elevates the H shaped arm 31 in Z direction and positions the feed tray at a delivery height (a handling reference position of the tray handling robot 3) for delivering magnetic head assemblies 9 to the head handling robot 8 (not shown, see FIG. 5)(step 103).

Through the control by the control unit (MPU) 6, the head handling robot 8 suction picks up a magnetic head assembly 9 from the feed tray and transfers the same to the inspection stage (step 104).

Then, the MPU renews the fed number N as N=N+1 (step 105), and judges whether or not the feed tray is empty based on N=M (step 106). Further, M is the maximum number (filled number) of magnetic head assemblies accommodated in the tray.

Herein, when the judgment is NO, the feed tray is returned to the rack position of the original step (the selected rack) in the tray placing rack 2 by the tray handling robot 3 controlled by the MPU (step 107).

Subsequently, the MPU enters into a waiting loop in which whether or not an inspection of a magnetic head assembly at the inspection stage is completed and the inspection result is output (step 108). Then, when the inspection result is output, the tray handling robot 3 controlled by the control unit (MPU) 6 takes out an accommodation tray in the rack corresponding to the rank according to the inspection result classified as rank A, rank B, rank C or rank D, and positions the accommodation tray at the handling reference position (step 109). The accommodation tray is one of trays stored in four steps below the feed trays in the tray placing rack 2.

The MPU enters into a waiting loop in which the accommodation tray taken out from the rack receives the magnetic head assembly 9 completed of the inspection from the head handling robot 8 at the handling reference position (at the delivery height for the delivering)(step 110). Then, through the control by the control unit (MPU) 6, the head handling robot 8 suction picks up the magnetic head assembly 9 completed of the inspection, transfers the same from the inspection stage to the tray 5 of the tray handling robot 3 and accommodates the magnetic head assembly 9 completed of the inspection at a predetermined position in the tray 5.

Herein, the judgment turns to YES, the MPU increments the number of the accommodation tray taken out among the accommodation numbers SA, SB, SC and SD in the accommodation trays (step 111). Then, whether or not the incremented number is M is judged (step 112). Herein, when the judgment is YES, it indicates that the accommodation tray is filled.

Herein, when the judgment is NO, the tray handling robot 3 controlled by the MPU returns the accommodation tray to the position of the original step (the rack selected by the rank according to the inspection result) in the tray placing rack 2 (step 113).

Then, although not shown in the drawing, the MPU subsequently judges whether or not the inspection of the magnet head assemblies has been completed, and when the judgment is NO, the process returns to step 102. When the judgment is YES, the process moves to step 118.

When all of the magnetic head assemblies 9 in a feed tray have been inspected at the inspection stage, no magnetic head assembly 9 remains in the tray and an empty tray 51 is generated, N=M holds in the judgment in the previous step 106 and the judgment in step 106 turns to YES.

In response to the YES judgment, the control unit (MPU) 6 moves to the subsequent step 114 and through control of the tray handling robot 3 moves the feed tray 5 treating as an empty tray to the position of space L between the rack at the upper most step in the tray placing rack 2 and the tray stacking rack 4 (step 114).

Subsequently, after executing the processes as shown in FIG. 3 (a)~FIG. 3 (e), the control unit (MPU) 6 elevates the tray handling robot 3 and stacks the empty tray 51 at the lower most step in the tray stacking rack 4 (step 115). Then, the tray handling robot 3 controlled by the control unit (MPU) 6 returns to the position of delivery height (the handling reference position)(step 116).

Since the empty tray is generated, the MPU subsequently selects the next rack position (presently a rack at second step from the above) as a rack position of a feed tray (step 117), and the process returns to step 108. Then, the MPU performs a control of accommodating a magnetic head assembly 9 completed of the inspection through the processes after step 108 in an accommodation tray according to the rank.

Further, as has been explained above, with regard to the rack position of the feed tray in step 117, the rack position after next is the third step from the above and thereafter the rack position returns to the upper most step to perform a cycle operation. To the rack step (one rack step among from the first step to the third step) of the emptied feed tray in this cycle operation, a feed tray is manually refilled successively.

When a condition comes about that about three pieces of empty trays are stacked on the tray stacking rack 4, a filled accommodation tray will be generated.

In such instance, the judgment in the previous step 112 turns to YES, and when the judgment turns to YES, the tray handling robot 3 controlled by the control unit (MPU) 6 treats the accommodation tray as a discharge tray and stores the same on the rack at the lower most step in the tray placing rack 2 (step 118). The discharge tray is manually collected at a proper timing from the rack at the lower most step. The rank of the accommodation tray to be discharged can be judged by observing the position of the empty rack in the ranked racks of the lower four steps. Alternatively, the rank can be judged when an empty tray is loaded into the empty rack. However, as in FIG. 5 embodiment, which will be explained later, by reading the tray number with a tray number reader, the number and the rank of the discharge tray can be separately managed and recorded.

Now, the refilling of a feed tray and discharging of a discharge tray are performed through manual operation, for example, the tray is inserted or taken out from a rack from the opened back face of the tray placing rack 2 at the position opposite to the tray handling robot 3. However, in this instance, each tray can be taken out from the front side where the tray handling robot 3 locates. Further, other than the manual operation, an empty tray can be inserted in an empty rack position or a discharge tray can be taken out from the lower most step in the tray placing rack 2 by the tray handling robot 3.

Further, the processes by the MPU herein select a rack position for a feed tray in step 101 and step 117. Accordingly, with regard to the feed tray in the tray placing rack 2, the tray handling robot 3 puts in and out a same feed tray from the rack until the tray is emptied.

Now, the empty tray re-use process will be explained.

When the loading process of a filled accommodation tray in the lower most step in the tray placing rack 2 is completed, subsequently, the tray handling robot 3 controlled by the control unit 6 moves to the position of the space L between the tray placing rack 2 and the tray stacking rack 4 (step 119). Herein, the control unit 6 elevates the tray handling robot 3 and causes to perform processes of opposite run as shown in FIG. 3 (*e*)~FIG. 3 (*a*). Through these processes an empty tray 51 stacked in the lower most step in the tray stacking rack 4 is taken out by the tray handling robot 3 (step 120). Then the control unit 6 returns the tray handling robot 3 to the height position of delivering the H shaped arm 31 (the handling reference position). Further, the H shaped arm 31 is lowered and the empty tray 51 is stored in the rack position where the accommodation tray was stored in step 113. Thereby, the empty tray is loaded in the rack position corresponding to the rank of the discharge tray in the tray placing rack 2 (step 121). Thereafter, the process returns to step 102.

In this manner, the control unit 6 performs the process of re-use of empty trays as accommodation trays. Thereby, discharging of accommodation trays from the inspection device is unnecessitated.

When the inspection of the magnetic head assemblies is continued in such a manner, the feed trays accommodating magnetic head assemblies before inspection are exhausted. Accordingly, when the stacking amount of the empty trays in the tray stacking rack 4 increases to about three, an operator manually adds a feed tray in the tray placing rack 2.

Figure 5:
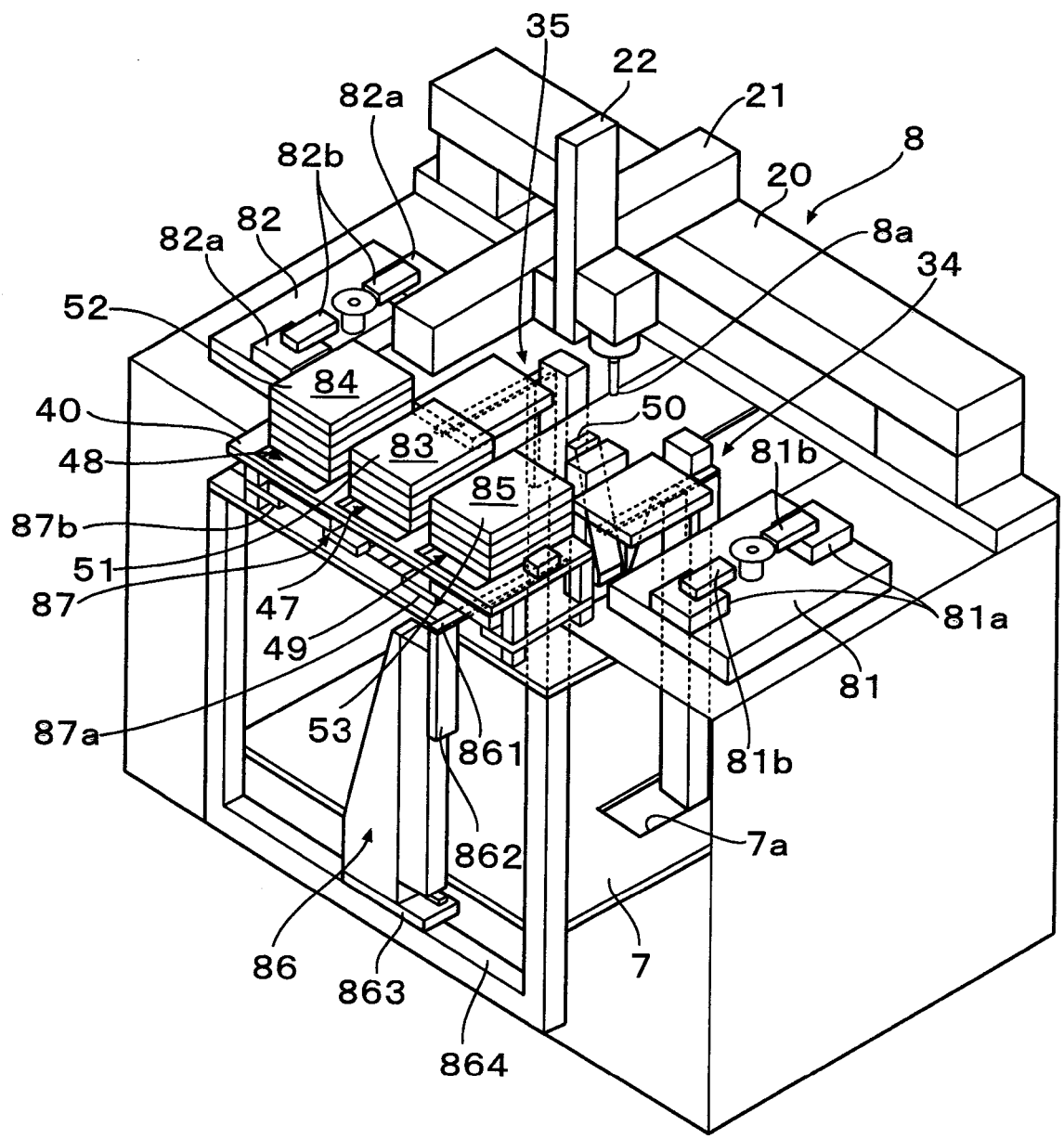
FIG. 5 is a view for explaining an outline of an embodiment when a tray handling mechanism of magnetic head assemblies (electronic parts) fed through a tray according to the present invention is applied to a magnetic head inspection device provided with two inspection stages.

FIG. 5 is a view for explaining an outline of an embodiment when a tray handling mechanism of magnetic head assemblies (electronic parts) fed through a tray according to the present invention is applied to a magnetic head inspection device provided with two inspection stages.

As shown in FIG. 5, a magnetic head inspection device 80 is provided with two inspection stages 81 and 82. Numeral 8 is the magnetic head handling robot that was not shown in FIG. 1. As the tray handling robot 3, in FIG. 5, two tray handling robots 34 and 35 are provided so as to correspond to the inspection stages 81 and 82. Corresponding to the tray placing rack 2, tray placing rack 23 and 24 are provided to which the tray handling robots 34 and 35 respectively put in and out trays. The details of these two multi step tray placing racks are shown in FIG. 6. In FIG. 1, a single multi step tray placing rack is provided.

Further different point of the present embodiment from the embodiment shown in FIG. 1 is that in a tray stacking rack 40 corresponding to the tray stacking rack 4 as shown in FIG. 1, other than the region of stacking empty trays two other stacking regions are adjacently provided. One of the two is a stacking region 84 where feed trays accommodating magnetic head assemblies before inspection are stacked, and the other is a stacking region 85 where trays determined as discharge trays fully accommodating electronic parts after inspection are stacked.

Through the provision of such regions other than the region of stacking empty trays, many feed trays can be fed once and any discharge trays can be collected once. Thereby, the processing efficiency for the feeding and discharging can be enhanced.

Likely in the present embodiment, the tray 5 is positioned and set at the handling reference position (delivery height position) in the magnetic head inspection device 8 by the tray handling robot 34 (35). Accordingly, X Y positional coordinates of respective boss pins 5*b* in the tray 5, in other words the coordinate positions of the magnetic head assemblies 9 accommodated in the tray 5 are fixedly determined at respective specific positions.

Therefore, the positions are stored in the memory of the control unit 6. In response to the control by the control unit 6, the head handling robot 8 successively picks up from an end a magnetic head assembly 9 from the tray 5 with reference to X Y positional coordinate of the boss pin 5*b* thereof or performs the handling process of accommodating magnetic assemblies 9 after inspection in an accommodation tray.

More specifically, the head handling robot 8 includes an X moving mechanism 20, a Y moving mechanism 21, a Z moving mechanism 22 and a suction collet 8*a* for sucking a magnetic head assembly 9 and provided at the lower side of the Z moving mechanism 22. According to the control by the control unit 6, the head handling robot 8 moves the suction collet 8*a* in XY direction by driving the X moving mechanism 20 and the Y moving mechanism 21 with reference to the X Y positional coordinates of boss pins 5*b* in the tray 5 arranged with a predetermined interval as shown in FIG. 2 and positions the suction collet 8*a* at a coordinate position of a magnetic head assembly 9 before inspection to be sucked on the tray 5. Then, the suction collet 8*a* is lowered by a predetermined amount in Z direction by the Z moving mechanism 22 and picks up the target magnetic head assembly 9 from the tray 5 by sucking. Alternatively, a sucked magnetic head assembly 9 after inspection is accommodated at a predetermined position in the tray 5 by inserting a boss pin 5*b* into the mounting hole 92 thereof (see FIG. 2).

A magnetic head assembly 9 picked up by the head handling robot 8 is once transferred to a mounting table (not shown) for a positioning mechanism to be prepositioned and after being prepositioned the magnetic head assembly 9 is transferred to a head clamp table of the inspection stage 81 or 82 and is set on the head clamp table.

The head clamp table are respectively provided at the top end side of head support arms 81*b* and 82*b* of head carriages 81*a* and 82*a* in the inspection stages 81 and 82. Further, the head clamp table is provided with a clamp mechanism. When the inspection of a magnetic head assembly 9 is completed either at the inspection stage 81 or the inspection stage 82, the magnetic head assembly 9 completed of the inspection is released from the clamping by the clamp mechanism on the head clamp table and the head handling robot 8 sucks the clamp released magnetic head assembly 9. Then, the head handling robot 8 picks up the same from the head clamp table, transfers the same to an accommodation tray placed at the reference position of the tray handling robot 34 (35) and accommodates the magnetic head assembly 9 after inspection at a predetermined position therein.

The accommodation process in an accommodation tray according to the present embodiment will be explained in more detail.

In step 108 in FIG. 4 flowchart, the MPU is in a waiting loop for judging whether or not an inspection result is output after the inspection of a magnetic head assembly at the inspection stage has been completed. In this instance, when the inspection result is output, the process moves to the next step 109. At this moment, the tray handling robot 34 (35) takes out an accommodation tray from a rack for a rank according to the inspection result of rank A, rank B, rank C or rank D and positions the accommodation tray at the handling reference position (the delivery height position). Then, in the next step 110, the tray handling robot 34 (35) receives the magnetic head assembly 9 after inspection from the head handling robot 8 in the accommodation tray at the handling reference position (the delivery height position).

In this instance, the head handling robot 8 loads the magnetic head assembly 9 after inspection at a position of an empty boss pin 5b next to the boss pin 5b where a magnetic head assembly is already accommodated with reference to X Y positional coordinates of respective boss pins 5b on the tray 5 placed according to the rank.

Subsequently, a stacking process of discharge trays according to the present embodiment will be explained.

In step 112 in FIG. 4 flowchart, when the judgment turns to YES, in the process in FIG. 4, the accommodation tray is treated as a discharge tray and is stored in the rack at the lower most step in the tray placing rack 2 in step 118. In this connection, in the present embodiment, since the stacking region 85 for stacking discharge trays is provided in the tray stacking rack 40, the discharge tray is stacked here. Then, herein as assumed that on the side face of the tray 5 a bar code label is adhered as the tray number, the bar code of the discharge tray is read.

Therefore, in the present embodiment, the step 118 in FIG. 4 is modified to a process of reading bar code of the tray. With regard to an accommodation tray as treated as a discharge tray after the YES judgment in step 112, the bar code thereof is read by a bar code reader 50, and the relationship between the rank according to the inspection result at this moment and the discharge tray (tray number) is stored in the control unit 6.

Now, the stacking process at the tray stacking rack 40 for stacking feed trays and discharge trays will be explained.

In the tray stacking rack 40, numeral 83 represents a stack region for empty trays 51, 84 represents a stack region for feed trays accommodating magnetic head assemblies before inspection and 85 represents a stack region for discharge trays accommodating electronic parts after inspection in full. In the present embodiment, a tray transfer robot 86 for transferring a tray between these stack regions and the tray handling robot 34 (35) and a tray delivery rack 87 for temporarily placing a tray are provided.

The tray delivery rack 67 is provided between the tray stacking rack 40 and the tray placing rack 23 and 24 (see FIG. 6). Because of this arrangement, the tray stacking rack 40 is shifted upward in comparison with the arrangement of the tray stacking rack 4 with respect to the tray placing rack 2. As shown in FIGS. 5 and 6, the tray delivery rack 87 includes two delivery tables 87a and 87b provided respectively for the inspection decks (the inspection stages) 81 and 82 and corresponding to the tray placing racks 23 and 24. Further, in FIG. 6, with regard to the delivery table 87b, only a part thereof can be seen.

Further, in the present embodiment, the feed tray and the discharge tray will be explained respectively as the feed tray 52 and the discharge tray 53 in relation to the empty tray 51.

Although the tray transfer robot 86 includes a like H shaped arm 861 as the H shaped arm 31 as shown in FIG. 1 and has a like structure as the tray handling robot 3, however, differs from the tray handling robot 3 because the tray transfer robot 86 is movable in Z axis direction and in X axis direction.

Numeral 862 is the in Z direction moving base and 863 is the in XZ axis moving mechanism. The tray transfer robot 86 moves in back and forth on a rail 864 along X axis. The movement thereof is controlled by the control unit 6.

Below the tray at the lower most step in the stacked empty trays 51 an opening 47 like the opening 43 is provided for the tray passing therethrough. Below the tray at the lower most step in the stacked feed trays 52 an opening 48 like the opening 43 is provided for the tray passing therethrough. Below the tray at the lower most step in the stacked discharge trays 53 an opening 49 like the opening 43 is provided for the tray passing therethrough. Accordingly, the respective trays stacked respectively can be passed in up and down direction through the respective corresponding openings 47, 48 and 49.

The respective openings 47, 48 and 49 for the stack region 83 of the empty trays 51, the stack region 84 of the feed trays 52 and the stack region 85 of the discharge trays 53 in the tray stacking rack 40 are respectively provided with the advancing and retreating mechanisms 45 and 46 constituted by such as two pieces of support pins 44a and 44b and air cylinders as explained in connection with FIG. 1 embodiment.

In such arrangement, under the control by the control unit 6, the tray handling robot 34 (35) places an empty tray 51 or a discharge tray 53 on the delivery table 87a (87b). The tray transfer robot 86 respectively receives an empty tray 51 under the control of the control unit 6 from the tray handling robot 34 (35) via the delivery table 87a (87b) (see FIG. 6), or respectively receives a discharge tray 53 from the tray handling robot 34 (35) via the delivery table 87a (87b), and after performing the operations as explained in connection with FIG. 3 (a)~(e), the received tray is stacked via the opening 47 or 49 as the tray at the lower most step. Further, the tray transfer robot 86 respectively receives a tray at the lower most step in the stacked empty trays 51 or feed trays 52 via the opening 47 or 48. The receive tray is respectively delivered to the tray handling robot 34 (45) via the delivery table 87a (87b).

FIG. 6 is a view for explaining the handling process of empty trays, feed trays and discharge trays for the tray stacking rack.

In FIG. 6, a part of the tray stacking rack 40 is broken so as to be seen the delivery table 87a. Since the structure of the tray delivery table 87b is the same as that of the tray delivery table 87a, the relationship between the tray transfer robot 86 and the delivery table will be explained in connection with the relationship between the tray transfer robot 86 and the delivery table 87a and the explanation at the side of the delivery table 87b is omitted.

The delivery table 87a receives an empty tray 51, a feed tray 52 or a discharge tray 53 transferred by the tray transfer robot 86 in response to the downward movement of the tray transfer robot 86 placing the tray.

For this purpose, the delivery table 87a is provided at both sides thereof with positioning rollers 88 that catch and receive both side walls of the tray with the outer circumferential edges thereof. The interval between the positioning rollers 88 locating at both sides of the delivery table 87a is determined in such a manner that the interval when the rollers 88 coming close most among the intervals between the outer circumferences is narrower than the width of the tray. Thereby, both sides of the tray can be held between the positioning rollers 88. Alternatively, although not illustrated, like the positioning rollers 17 as explained in connection with FIG. 1, through provision of tray receiving metal fittings under the positioning rollers 88, both side ends of the tray can be held by the tray receiving metal fittings. In this instance the narrowest interval between the outer circumferences of the positioning rollers 88 at both sides is preferably determined to be slightly broader than the width of the tray.

Further, the delivery table 87*a* is provided with at the front and back and right and left thereof positioning rollers 89 like the positioning rollers 17. Below the delivery table 87*a*, an opening 871 is provided for escaping the H shaped arm 861 like the H shaped arm 31.

Under the control by the control unit 6, the tray transfer robot 86 receives a tray at the lower most step of the empty trays 51 or the feed trays 52 via the respective openings 47 and 48 with the H shaped arm 861. Then, the H shaped arm 861 is positioned at a space above the delivery table 87*a* and is moved in X axis direction by the XZ axis moving mechanism 863 to transfer the tray above the delivery table 87*a*.

When the tray reaches above the delivery table 87*a*, through the control by the control unit 6, the tray transfer robot 86 lowers the H shaped arm 861 in Z axis direction and places an empty tray 51 or a feed tray 52 respectively on the delivery table 87*a*. The tray transfer robot 86 placing the tray on the delivery table 87*a* subsequently positions the H shaped arm 861 at a space below the delivery table 87*a* to retreat from the delivery table 87*a* and moves the H shaped arm 861 in opposite direction along X axis to return the same to the original position.

When the H shaped arm 861 receives a tray from the delivery table 87*a*, the operation of the H shaped arm 861 is opposite from the above.

When the tray handling robot 34 (35) receives a tray from the tray delivery table 87*a*, through the control by the control unit 6, the advanced tray handling robot 34 (35) positions the H shaped arm 31 at a space below the delivery table 87*a* and elevates the H shaped arm 31 in Z axis direction. Thereby, the tray is placed from the delivery table 87*a* on the H shaped arm 31 and is picked up by the H shaped arm 31. The operation thereafter of the tray handling robot 3 is the same as the tray put in and out operation from the tray placing racks 23 and 24 as explained above. In FIG. 6, the rack of second party in FIG. 1 is simply replaced by the delivery table 87*a*.

Thereby, the tray transfer is performed from the tray transfer robot 86 to the tray handling robot 3.

When an empty tray 51 or a discharge tray 53 is placed on the H shaped arm 31 of the tray handling robot 3, the empty tray 51 or the discharge tray 53 is placed on the delivery table 87*a*. The tray placed on the delivery table 87*a* is picked up from the delivery table 87*a* by positioning the H shaped arm 861 of the tray transfer robot 86 at a space below the delivery table 87*a* and by elevating the same in Z axis direction. The tray transfer robot 86 positions through the control by the control unit 6 the H shaped arm 861 at a space above the delivery table 87*a* and moves the tray along X axis. Then, the tray transfer robot 86 respectively places the empty tray 51 on the stack region 83 and the discharge tray 53 on the stack region 85.

Since the stacking operation of an empty tray 51 on the stack region 83 and that of a discharge tray 53 on the stack region 85 are the same as the tray stacking operation performed by the tray handling robot 3 as explained in connection with FIG. 3 (*a*)~FIG. 3 (*e*), the explanation thereof is omitted. Further, since the tray taking out operation from these regions is also as same, the explanation thereof is omitted.

As has been explained hitherto, in FIG. 1 embodiment, although the stack region 84 for the feed trays 52 and the stack region 85 for the discharge trays 53 are not provided, both or either of both can of course be provided adjacent the stack region for the empty trays. In this instance, a second tray handling robot operating likely as the tray transfer robot 86 is to be provided separately, alternatively, the tray handling robot 3 can be modified to be movable in right and left so as to perform the like operation as the tray transfer robot 86.

In the embodiments, an example is given in which the trays stacked on the tray stacking rack are supported by the support pins at the bottom of the tray from both sides by projection the support pins above the opening from both sides thereof. However, the support pins can be provided below the opening. Namely, in the present invention, it is satisfactory if the trays are held at the position of the opening or a position above the opening in the tray stacking rack.

Further, In FIG. 1 and FIG. 5 embodiments, the tray stacking rack may be an empty tray rack on which at least one empty tray is held at or above the position of the first opening.

Further, in the embodiments, the magnetic head assemblies are accommodated in the tray, however, the magnetic head assemblies can be replaced by electronic parts in general. Accordingly, the present invention can be applied to a tray handling mechanism to which electronic parts in general are fed through a tray.

Further, In FIG. 5 embodiment, two inspection decks 81 and 82 are provided in order to enhance inspection efficiency, however, the present invention is not be limited to the provision of the plurality of inspection decks.

The invention claimed is:

1. A tray handling mechanism handling trays from which electronic parts are fed comprising:

a tray placing rack for storing trays in a plurality of steps and stores a tray accommodating electronic parts before inspection and a tray accommodating electronic parts after inspection in respective ones of the steps thereof;

an empty tray rack which is located above the tray placing rack and has a first opening permitting the tray to pass therethrough in up and down directions and on which an empty tray emptied by taking out electronic parts from trays accommodating the electronic parts before inspection is held at or above the position of the first opening;

a first tray handling robot provided facing a front face of the tray placing rack for putting one of the trays in and out from the tray placing rack so as to move one of the trays in up and down directions along the front face for putting one of the trays in and out from the steps in the tray placing rack;

a second tray handling robot for putting one of the trays in and out from the tray placing rack; and a control unit which performs processes of feeding the empty tray on the empty tray rack from a lower side of the first opening by controlling the first tray handling robot or said second tray handling robot, taking out the empty tray placed on the empty tray rack from the bottom of the first opening as a tray for accommodating electronic parts after inspection by controlling the first tray handling robot or the second tray handling robot, and feeding the same in the tray placing rack by the first tray handling robot, wherein said tray placing rack further includes:

a pair of opposed side plates which define a tray placing area therebetween;

a plurality of pairs of tray support fittings which protrude in a spaced, vertical relationship from said opposed side plates, where said tray support fittings define tray placement locations for each of said steps and further including an interval between each of said tray support fittings to allow said first handling robot or second handling robot to set said tray on one of said pairs of tray support fittings; and a plurality of rollers, each disposed at a step to define a maximum entry point for said tray to be placed in said tray placing area, wherein said first handling robot further includes:

an arm for moving said tray; and drive means for vertical motion and horizontal motion, where said arm is configured to move vertically relative to, and horizontally into and out of said tray placing area, wherein said empty tray rack further includes:

a pair of oppositely disposed support pins configured to engage a bottom-most tray in a stack of trays; and drive means for moving said support pins horizontally towards and away from said bottom-most tray to support said stack of trays.

2. A tray handling mechanism according to claim 1, wherein the empty tray rack is a tray stacking rack on which the stack of trays, which are empty trays, are held at or above the position of the first opening in a stacked manner and the first tray handling robot stores the empty tray in the position of the tray placing rack from which a tray for accommodating the electronic parts after inspection being filled therewith has been discharged.

3. A tray handling mechanism according to claim 2, wherein the tray accommodating electronic parts before inspection is a first tray, the tray accommodating electronic parts after inspection in respective positions thereon is second tray, the tray placing rack includes a first step for storing the first tray and a plurality of second steps for storing respectively a plurality of the second trays, and wherein said arm of the first tray handling robot is further configured to place one of the first tray, the second tray and the empty tray.

4. A tray handling mechanism according to claim 3, wherein under a state where the first tray is placed on the arm, one of the electronic parts in the first tray is picked up from the first tray by an electronic parts handling robot and fed to an inspection stage for inspecting the electronic parts, and one of the electronic parts having completed inspection is picked up from the inspection stage by an electronic parts handling robot and is accommodated in the second tray placed on the arm.

5. A tray handling mechanism according to claim 4, wherein the pair of support pins are respectively provided above the first opening at both sides thereof in a manner being horizontally projectable above the first opening, and the bottom-most tray is supported from below and from the sides by the pair of support pins and is held on the tray stacking rack.

6. A tray handling mechanism according to claim 5, further comprising a delivery table for placing the tray is provided between the tray placing rack and the tray stacking rack, wherein the second tray handling robot transfers the empty tray between the tray stacking rack and the delivery table, and the control unit performs a process of transferring the empty tray between the first tray handling robot and the second tray handling robot via the delivery table.

7. A tray handling mechanism according to claim 3, wherein the tray stacking rack includes a second opening that permits the tray to pass therethrough in up and down directions and the first tray is held at or above a position of the second opening in the tray stacking rack in a stacked manner, and after the empty tray being stacked in the tray stacking rack, the control unit performs a process of taking out the first tray from below the second opening through control of the first tray handling robot or the second tray handling robot and of storing the same by the first tray handling robot in the first step in which the empty tray having been placed in the tray stacking rack was stored.

8. A tray handling mechanism according to claim 7, wherein the tray stacking rack includes a third opening that permits the tray to pass therethrough in up and down directions and a discharge tray accommodating electronic parts after inspection in full is held at a position of the third opening or above the position in a stacked manner, and after accommodating the electronic parts after inspection in full in the second tray placed on the arm, the control unit performs a process of passing the second tray placed on the arm through the third opening from below the same and stacking the same as the discharge tray at or above a position of the third opening through control of the first tray handling robot or the second tray handling robot.

9. A tray handling mechanism according to claim 3, wherein the tray stacking rack includes a second opening that permits the tray to pass therethrough in up and down directions and a discharge tray accommodating electronic parts after inspection in full is held at a position of the second opening or above the position in a stacked manner, and after accommodating the electronic parts after inspection in full in the second tray placed on the arm, the control unit performs a process of stacking the second tray placed on the arm as the discharge tray at or above a position of the second opening through control of the first tray handling robot or the second tray handling robot.

10. A tray handling mechanism according to claim 9, wherein after the discharge tray being stacked in the tray stacking rack, the control unit performs a process of taking out the empty tray in the tray stacking rack from below the first opening through control of the first tray handling robot or the second tray handling robot and of storing the same by the first tray handling robot in the second step in which the discharge tray having been placed in the tray stacking rack was stored.

11. A tray handling mechanism according to claim 10, wherein the electronic parts are magnetic head assemblies, and the electronic parts handling robot is a handling robot for the magnetic head assemblies and includes a suction head which sucks and holds the magnetic head assembly.

12. A tray handling mechanism according to claim 3, wherein two inspection stages are provided, and an additional tray placing rack and an additional first tray handling robot are provided so that each of the respective two inspection stages have corresponding tray placing racks and first tray handling robots, the electronic parts are magnetic head assemblies, the electronic parts handling robot is a handling robot for the magnetic head assemblies including a suction head which sucks and holds the magnetic head assembly, and the tray stacking rack is provided in common for the two inspection stages at a position having an equal distance to the two tray placing racks.

13. A tray handling mechanism according to claim 12, further comprising a delivery table for placing the tray is provided between the tray placing rack and the tray stacking rack, wherein the tray stacking rack includes a second opening that permits the tray to pass therethrough in up and down directions and the first tray is held at or above a position of the second opening in the tray stacking rack in a stacked manner, the control unit performs a process of transferring the empty tray and the first tray between the first tray handling robot and the second tray handling robot via the delivery table, and after the empty tray being stacked in the tray stacking rack, the control unit performs a process of taking out the first tray from below the second opening through control of the first tray handling robot or the second tray handling robot and of storing the same by the first tray handling robot in the first rack in which the empty tray having been placed in the tray stacking rack was stored.

14. A tray handling mechanism according to claim 13, wherein the tray stacking rack includes a third opening that permits the tray to pass therethrough in up and down directions and a discharge tray accommodating electronic parts after inspection in full is held at or above a position of the third opening in a stacked manner, the control unit performs a process of further transferring the second tray between the first tray handling robot and the second tray handling robot via the delivery table and after accommodating the electronic parts after inspection in full in the second tray placed on the arm, the control unit performs a process of passing the second tray placed on the arm through the third opening from below the same and stacking the same as the discharge tray at or above a position of the third opening through control of the first tray handling robot or the second tray handling robot.

15. An inspection device for electronic parts including a tray handling mechanism according to claim 1 and an inspection stage for inspecting the electronic parts.

16. An inspection device for electronic parts including a tray handling mechanism according to claim 2 and an inspection stage for inspecting the electronic parts.

17. An inspection device for electronic parts including a tray handling mechanism according to claim 3 and an inspection stage for inspecting the electronic parts.

18. An inspection device for electronic parts including a tray handling mechanism according to claim 7 and an inspection stage for inspecting the electronic parts.

19. An inspection device for electronic parts including a tray handling mechanism according to claim 9 and an inspection stage for inspecting the electronic parts.

20. An inspection device for electronic parts including a tray handling mechanism for electronic parts fed by a tray according to claim 12.

* * * * *